Figure 1:
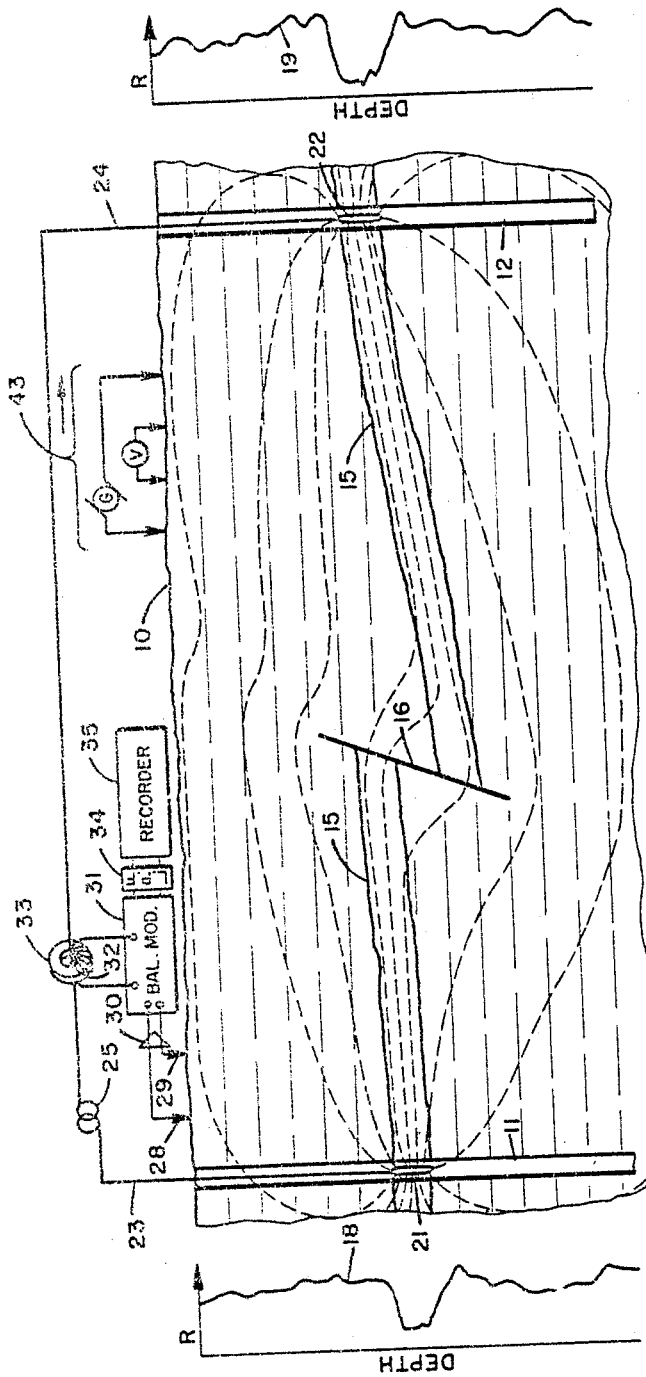

Sept. 29, 1964   J. D. EISLER   3,151,291
METHOD OF LOCATING SUBSURFACE LATERAL DISCONTINUITIES
BETWEEN TWO SPACED WELLS
Filed Dec. 7, 1959

INVENTOR.
JOSEPH D. EISLER
BY Newell Pottoy
ATTORNEY

United States Patent Office 3,151,291
Patented Sept. 29, 1964

3,151,291
METHOD OF LOCATING SUBSURFACE LATERAL DISCONTINUTIES BETWEEN TWO SPACED WELLS
Joseph D. Eisler, Tulsa, Okla., assignor to Pan American Petroleum Corporation, Tulsa, Okla., a corporation of Delaware
Filed Dec. 7, 1959, Ser. No. 857,980
6 Claims. (Cl. 324—1)

This invention relates to electrical geophysical prospecting and is directed particularly to a method of such prospecting for locating subsurface lateral discontinuities. More specifically, the invention is directed to an electrical prospecting method for locating buried faults and the like in the subsurface strata between two wells.

In geophysical exploration for oil and gas and in the exploitation of deposits of such minerals after they have been discovered, it is frequently of extreme importance to know whether the subsurface strata at and near the depth of interest are continuous in the interval between two spaced wells or are interrupted by a subsurface fault, a facies change, a pinchout, or some similar type of horizontal variation or discontinuity. Data from measurements made in the two wells in question seldom give any clues as to whether such a condition exists or to its approximate location.

Attempts have been made to utilize electrical-resistivity and similar types of electrical measurements made at the ground surface to detect horizontal variations in the characteristics of the deep subsurface strata. Such surface methods of exploration generally fail, however, because they are much more sensitive to small variations in near-surface electrical properties than to large variations in such properties at a considerable depth. This is true generally, regardless of the span of the electrodes used in the surface prospecting methods. Large electrode spacings can reduce but still cannot eliminate the undue influence of near-surface lateral changes.

Some improvement in the sensitivity of electrical measurements to deep anomalies occurs when one of the current or potential electrodes is placed in a well, but this configuration is still unduly sensitive to surface effects because the current-flow path usually involves at least one electrode at the ground surface.

In view of the foregoing, it is a primary object of my invention to provide a novel and improved method of electrical prospecting for subsurface lateral variations or discontinuities in cases where two wells are available for exploration in the space between them, which method avoids the drawbacks noted above in regard to the prior art methods. A further object is to provide such an exploration method which substantially reduces the influence of near-surface lateral variations on the measurements indicative of the deep variations it is desired to observe. A still further object of the invention is to provide a novel method of exploration which utilizes an optimum pattern of current flow for detecting the desired anomalies. Further objects, uses, and advantages of the invention will become apparent as the description proceeds.

Briefly stated, my improved method of locating subsurface faults, stratigraphic traps and like discontinuities between two spaced wells comprises choosing a low-resistivity formation present in each of the wells at or near the depth of interest and passing electric current through this formation and the surrounding earth medium between the wells, so that a larger than normal proportion of the electric current flowing through the earth follows the formation, to be interrupted by the discontinuity if it exists. Measurements are then made at the ground surface of the potential gradient produced by the introduced current, along a line which preferably includes a traverse between the two wells. Anomalous deviations from a normally smoothly varying surface potential gradient will occur due to the distortion of the current flow at depth by the discontinuity if it exists, and such anomalous variations can be differentiated, if desired, from the effects of near-surface variations in the earth's electrical properties by comparison with a shallow-resistivity survey along the traverse in question.

The manner in which this is done, as well as the kind of results to be expected in a typical case are shown by the drawing forming a part of this application and illustrating a typical embodiment of the invention. In the drawing, FIGURE 1 is a diagrammatic earth cross-section including two spaced wells; and FIGURE 2 is a graph showing the results of applying the invention to the geological problem illustrated in FIGURE 1.

Figure 2:
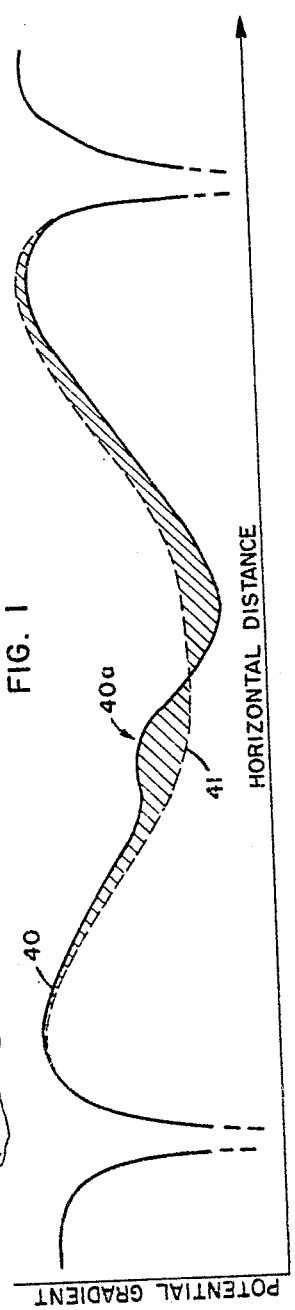

Referring now to the drawing in detail, FIGURE 1 is a cross-section of the earth in highly schematic form taken from the surface 10 downwardly and including two spaced wells 11 and 12 which extend from the surface 10 to some substantial depth. Typically this depth may be of the same order of magnitude as the spacing between the wells, but frequently it will be greater or less by a substantial factor. At some substantial depth below ground surface 10 are various formations including a low-resistivity formation 15 which is present in both of wells 11 and 12. The mere presence of stratum 15 in both wells, however, is no guarantee of its continuity between the wells, as it may be, and is assumed to be for purposes of this description, interrupted by a fault 16.

If fault 16 extends to or near to the ground surface 10, its existence and location pose no problems, but it is frequently the case that there is no indication at surface 10 of the presence or location of fault 16; nor is its presence revealed in any manner by the respective electrical-resistivity well logs 18 and 19 of the wells 11 and 12. These logs, correlated in position with the respective wells closest thereto on FIGURE 1 of the drawing are in every way conventional. Their chief utility in the present invention is in identifying by correlation and by its low resistivity value the presence and depth of stratum 15 in the respective wells 11 and 12.

In order to test for the continuity of stratum 15 between wells 11 and 12, or for the presence and location of a discontinuity such as fault 16 if it exists, each of a pair of electrodes 21 and 22 is placed adjacent the stratum 15 in one of the respective wells 11 and 12 and is connected by a corresponding one of insulated cables 23 and 24 to an electric generator 25 at the ground surface 10. Upon operating the generator 25, electric current flows through the earth between the electrodes 21 and 22, and a substantial fraction of the current remains confined within the stratum 15 due to its lower resistivity relative to the surrounding strata.

The dotted lines extending through the earth between the electrodes 21 and 22 show some of the approximate paths of the current passing between the two electrodes. If the stratum 15 is uniform between wells 11 and 12 then the lines of current flow are relatively smooth curves. However, due to the presence of fault 16 in the case illustrated, a substantial distortion in this current flow occurs where the stratum 15 is terminated by the fault 16, at which place the current, seeking to flow along the low-resistance path offered by stratum 15, tends to follow the shortest path across the fault through the more resistive formations. This distortion of the normal pattern of current flow is accompanied by a corresponding distortion of the equipotential lines characterizing this flow, which lines are everywhere at right angles to the current-flow lines shown.

This distortion of the potentials is detected at the ground surface 10 along a traverse extending at least between wells 11 and 12 and preferably for some distance beyond each well head. With current flowing through the earth between electrodes 21 and 22, measurements are made by contacting surface 10 with a pair of spaced potential electrodes 28 and 29 and recording the potential difference between them as a function of position along the traverse while maintaining their spacing constant.

While it would be possible to utilize a direct-current flow, it is preferred that the current supplied by generator 25 be alternating current of a relatively low frequency, such as from one to one thousand cycles per second. Besides avoiding electrolysis, electrode polarization, and other effects of direct current, alternating current enables the detection of smaller potentials and greater discrimination against noise. Thus, the potentials detected by electrodes 28 and 29 are amplified by an alternating-current amplifier 30 and applied to one pair of input terminals of a balanced or ring modulator 31. The other pair of input terminals of modulator 31 are connected to a winding 32 on a toroidal ferromagnetic core 33 which surrounds one of the current-carrying leads from generator 25 such as the lead 24. The output leads of modulator 31 are connected to a low-pass filter 34, the output of which is recorded by a recorder 35.

As is well known (see, for example, U.S. Patent 2,520,677), the modulator 31 acts as a synchronous rectifier and produces at its output a direct-current voltage proportional to the product of the two inputs having the same frequency. Thus, in combination with filter 34, which passes substantially only direct current, modulator 31, fed with the output frequency of generator 25 by coil 32, discriminates very strongly against all other frequencies in the voltage detected by electrodes 28 and 29. Therefore, with the current supplied by generator 25 held substantially constant, recorder 35 responds to substantially only the variations in the potential difference produced by this current at electrodes 28 and 29.

In FIGURE 2, the solid-line curve 40 is a graph of the potential gradient, or the potential difference electrodes 28 and 29, as a function of position or horizontal distance along the traverse at surface 10 between wells 11 and 12. FIGURE 2 is shown on the drawing correlated in position and horizontal scale with respect to FIGURE 1. In the absence of fault 16, the potential gradient would be the dashed line 41, so that the lightly cross-hatched section of FIGURE 2 represents the anomaly produced by fault 16. The existence and position of fault 16 are not only revealed as being in the neighborhood of the peak 40a, but the lower-than-normal potential gradient to the right of peak 40a indicates the down-thrown side of the fault.

It sometimes happens that the potential gradient recorded along the surface traverse by recorder 35, for constant current flow between electrodes 21 and 22, is not the smoothly varying curve 40 of FIGURE 2 but may include some anomalous variations which are not due to fault 16 but are rather the effects of surface or near-surface variations in electrical resistivity. In order to detect these variations if present, so as not to be misled by their appearance on the anomaly curve 40, it is preferred to perform a conventional shallow electrical-resistivity survey along the surface traverse. For example, by moving an array 43 of two electrical current and two potential electrodes at equal and constant spacings along the traverse in a manner well known in the prior art, and making readings of the induced potential at a series of points, any near-surface resistivity variations can be readily ascertained and allowed for in interpreting anomaly curve 40.

While the stratum 15 may not necessarily be the one of primary interest, in that it may not be the stratum which is productive of oil and gas, for example, nevertheless it may be used as the diagnostic stratum for determining the continuity of other strata of economic interest which lie conformably above and below the layer 15. In any event, by utilizing the high-conductivity properties of the stratum 15 relative to the adjacent strata, a much more favorable pattern of current flow for detecting the fault 16 may be obtained than would be true if the electrodes were placed either on the ground surface or adjacent more highly resistive strata. Of course, the nearer the stratum 15 occurs to the ground surface or the nearer the fault 16 penetrates toward this surface, the stronger is the anomaly observed on the curve 40 at the ground surface. However, even for depths of the stratum 15 which are quite large, it is to be expected that the anomaly produced by the fault 16 will be detectable at the ground surface 10 at a level sufficient to override the ambient noise. In addition to, or instead of, measuring the potential gradient along the ground-surface traverse between the two wells, the gradient can be similarly measured along one or more lines offset from but parallel thereto. By locating the fault anomaly on two spaced parallel traverses, the strike of the fault can be determined. In the alternative, additional gradient measurements may be made along one or more lines at any angle, such as perpendicular, to the preferred traverse, to determine the strike of the fault.

Although my invention has thus been described in terms of the foregoing embodiment and specific examples, it is to be understood that it is not to be considered as limited to the specific details described, but its scope is preferably to be ascertained from the appended claims.

I claim:

1. The method of determining the existence and approximate location of a discontinuity in subsurface strata extending between two spaced wells, which method comprises placing each electrode of a pair of electrodes in a respective one of said wells within a low-resistivity subsurface stratum likely to be interrupted by said discontinuity if it exists, connecting said electrodes to a generator of electric power, passing electric current from said generator through the earth between said electrodes, and measuring the potential gradient at the ground surface as a function of distance along a traverse between said wells due to the flow of said current, whereby deviations from a smoothly varying gradient curve may be observed to show said discontinuity.

2. The method of determining the existence and approximate location of a discontinuity in subsurface strata extending between two spaced wells which method comprises passing electric current through the earth between a point within a low-resistivity stratum in one well and a point within said stratum in the other well, said low-resistivity stratum being one likely to be interrupted by said discontinuity if it exists, and measuring the potential gradient produced by said current at the ground surface as a function of distance along a traverse between said wells, whereby deviations from a smoothly varying gradient curve may be observed as indications of said discontinuity.

3. The method of determining the existence and approximate location of a discontinuity in subsurface strata at least some of which extend between two spaced wells, which method comprises measuring the electrical resistivity of surface and near-surface strata along a first line which includes a traverse between said wells, passing electric current though the earth between two points each within a known low-resistivity stratum and each in a respective one of said two wells, said stratum being one likely to be interrupted by said discontinuity if it exists, and measuring a function of the potential gradient of said current as a function of distance along said first line whereby anomalous variations of said gradient, not associated with natural variations of said electrical resistivity and differing from smooth normal variations of said gradient, may be observed as indications of the existence and approximate location of said discontinuity.

4. The method as in claim 3 wherein said electric current is alternating current of a frequency between about one and one thousand cycles per second.

5. The method as in claim 3 including the further step of measuring said resistivity and said potential gradient function along a second line which crosses said fault at a different location from said first line, whereby the strike of said fault may be inferred from the alignment of anomalies on said lines.

6. The method as in claim 5 wherein said first and second lines are parallel and spaced apart a substantial distance.

References Cited in the file of this patent
UNITED STATES PATENTS

| | | |
|---|---|---|
| 2,150,517 | Muzzey | Mar. 14, 1939 |
| 2,183,565 | Hawley | Dec. 19, 1939 |
| 2,334,491 | Jakosky | Nov. 16, 1943 |
| 2,599,688 | Brant | June 10, 1952 |
| 2,885,633 | Cook | May 5, 1959 |